Figure 1:
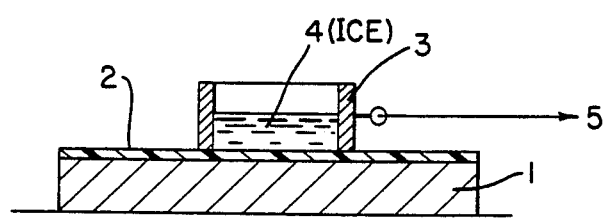

United States Patent [19]

Enjo et al.

[11] Patent Number: 4,685,967
[45] Date of Patent: Aug. 11, 1987

[54] DEICING COATING COMPOSITION

[75] Inventors: Naonori Enjo, Suita; Masayoshi Shinjo, Settsu; Yasuko Okazaki, Yamatokoriyama; Kazunori Hayashi, Settsu, all of Japan

[73] Assignee: Daikin Industries Ltd., Osaka, Japan

[21] Appl. No.: 856,342

[22] Filed: Apr. 28, 1986

[30] Foreign Application Priority Data

May 2, 1985 [JP] Japan ................................ 60-94888

[51] Int. Cl.$^4$ .............................................. C09K 3/18
[52] U.S. Cl. ........................................... 106/13; 106/2
[58] Field of Search ....................................... 106/13, 2

[56] References Cited

U.S. PATENT DOCUMENTS 2,681,324  6/1954  Hochberg .......................... 428/422
4,215,178  7/1980  Martin ................................. 106/13
4,366,300  12/1982  DeLescluse ........................... 106/2

Primary Examiner—Robert A. Wax
Attorney, Agent, or Firm—Murray and Whisenhunt

[57] ABSTRACT

A deicing coating composition characterized in that the composition comprises a synthetic resin coating composition of the organic solvent type, at least one fluorine-containing compound selected from the group consisting of urethane, phosphate, phosphonic acid derivative, phosphinic acid derivative, polyether, polyester and polyvinyl compounds having a perfluoroalkyl group with 6 to 20 carbon atoms, and when required, an alkali metal compound of the formula

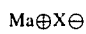

wherein M is an alkali metal, X is an inorganic acid radical, hydroxyl group or organic acid radical, and a is an integer of from 1 to 4.

6 Claims, 1 Drawing Figure

DEICING COATING COMPOSITION

The present invention relates to a coating composition for preventing ice deposition, and more particularly to a deicing coating composition which comprises a synthetic resin coating composition of the organic solvent type and a fluorine-containing compound having a perfluoroalkyl group, with addition of an alkali metal compound to the resin composition when required, and which is adapted to prevent ice deposition from firmly adhering to the surface of articles.

It has heretofore been attempted to preclude articles from ice deposition by coating the articles with various materials to thereby reduce the force of adhesion of ice. Silicone resin, fluorocarbon resin and rubber materials are known as such coating materials. Although the adhesion of ice to the surface of articles can be diminished to some extent by these coating materials, it is impossible to thereby completely obviate strong adhesion due to the hydrogen bond of water. Accordingly, the present applicant conducted basic research on the mechanism of ice deposition and already proposed a deicing coating composition having higher ability to prevent ice deposition than the conventional coating materials and comprising the combination of an organopolysiloxane resin and an alkali metal compound having activity to release the hydrogen bond (see Unexamined Japanese Patent Publication No. 1984-25868).

However, although substantially satisfactorily usable for preventing ice deposition, the proposed deicing coating composition of the organopolysiloxane resin type has the drawbacks of being costly because the organopolysiloxane resin is much more expensive than other synthetic resins and necessitating a primer before application because of the poor adhesion of the composition to the article to be coated.

Therefore, it has recently been strongly desired in the art concerned to develop organic coating compositions which are equivalent or superior to the silicone resin type composition, using as the base resin an organic synthetic resin heretofore used for various coating compositions, such as acrylic, polyurethane or epoxy resin, in place of the organopolysiloxane base resin.

In order to impart an outstanding function of preventing ice deposition to synthetic resin coating compositions of the organic solvent type conventionally used for wide application, we conducted intensive research on perfluoro compounds which are extremely small in intermolecular cohesive force and chemically stable and exhibit exceedingly low surface tension and found that a coating composition having high ability to prevent ice deposition can be obtained by adding to such a composition a specified amount of polymer of a (meth-)acrylic monomer containing a perfluoroalkyl group with a specified number of carbon atoms (Japanese Patent Application No. 1984-215339). We also developed a coating composition having deicing ability by further admixing an alkali metal compound with the ice deposition preventing composition (Japanese Patent Application No. 1984-215338).

The object of the present invention is to provide deicing coating compositions as improvements over the conventional compositions mentioned above.

The above and other objects of the invention will become apparent from the following description.

The present invention provides a deicing coating composition characterized in that the composition comprises a synthetic resin coating composition of the organic solvent type and 0.1 to 75 parts by weight, per 100 parts by weight of the resin solids of the component composition, of at least one fluorine-containing compound selected from the group consisting of urethane, phosphate, phosphonic acid derivative, phosphinic acid derivative, polyether, polyester and polyvinyl compounds having a perfluoroalkyl group with 6 to 20 carbon atoms. The invention also provides a deicing coating composition prepared by adding to the above deicing coating composition 0.1 to 50 parts by weight of an alkali metal compound per 100 parts by weight of the resin solids of the component composition, the alkali metal compound being represented by the formula

$$M_a^{\oplus} X^{\ominus}$$

wherein M is an alkali metal selected from among Li, Na and K, X is an inorganic acid radical, hydroxyl group or organic acid radical, and a is an integer of from 1 to 4.

The deicing coating composition of the present invention has ability to prevent ice deposition presumably because the fluorine-containing compound present forms a microphase separation structure in the coating formed from the composition to become firmly fixed to the coating and also acts to reduce the surface energy of the coating. Further when the alkali metal compound is used conjointly with the fluorine-containing compound, the alkali metal compound will coact with the latter to produce a synergistic effect to prevent ice deposition. The action of the alkali metal compound will be described, for example, with reference to a lithium compound. The ionic radius of $Li^{\oplus}$ is small (0.6 angstrom), so that the hydration energy is as great as 125 Kg cal g/ion. (For reference, $Na^{\oplus}$ has hydration energy of 94.6 Kg cal g/ion.) Around the $Li^{\oplus}$ ion, the ion has attracted thereto five molecules of water and further ten molecules of water around these water molecules. The water molecules are positioned very close to the lithium ion and are therefore held attracted thereto with greater energy than the hydrogen bond without forming hydrogen bonds. Consequently, the lithium compound trapped in the matrix of the organic resin does not permit freezing of the water molecules attracted thereto on the surface of the coating, thus obviating adhesion of ice. Although the $Na^{\oplus}$ ion and $K^{\oplus}$ ion act similarly, the $Li^{\oplus}$ ion is exceedingly effective and is therefore more suitable.

The synthetic resin coating composition of the organic solvent type to be used in the present invention may be in the form of an organic solvent solution or organic solvent dispersion. Known synthetic resin coating compositions are usable which include, for example, coating compositions of acrylic resins, polyurethane resins, epoxy resins, alkyd resins and the like. Among these, acrylic resin, polyurethane resin and epoxy resin coating compositions are desirable since these compositions are more excellent than the others in the properties of coatings at low temperatures of up to 0° C. Typical examples of synthetic resin coating compositions of the organic solvent type will be described below.

Acrylic resin type coating composition is prepared by adding to an acrylic resin obtained by polymerizing at least one ethylenically unsaturated monomer by a conventional method, an organic solvent, as required, crosslinking agent (melamine resin, polyisocyanate, alkoxysilane compound, etc.), coloring agent (pigment, dye), auxiliary agent (pigment-dispersing agent, surface flowability adjusting agent, etc.). Examples of useful ethylenically unsaturated monomers whih constitute the acrylic resin are (meth)acrylic $C_{1\sim18}$ alkyl esters such as methyl (meth)acrylate, ethyl (meth)acrylate, propyl (meth)acrylate, isopropyl (meth)acrylate, butyl (meth)acrylate, hexyl (meth)acrylate, 2-ethylhexyl (meth)acrylate, octyl (meth)acrylate, lauryl (meth)acrylate, etc; glycidyl (meth)acrylate; (meth)acrylic $C_{2\sim18}$ alkoxyalkyl esters such as methoxybutyl (meth)acrylate, methoxyethyl (meth)acrylate, ethoxybutyl (meth)acrylate, etc; (meth)acrylic $C_{2\sim3}$ alkenyl esters such as allyl (meth)acrylate, etc; (meth)acrylic $C_{2\sim8}$ hydroxyalkyl esters such as hydroxyethyl (meth)acrylate, hydroxypropyl (meth)acrylate, etc; (meth)acrylic aminoalkyl esters such as dimethylaminoethyl (meth)acrylate, diethylaminoethyl (meth)acrylate, etc; (meth)acrylamide; (meth)acrylic acid, etc.

When required, an unsaturated monomer other than the above acrylic monomers can be used conjointly in order to obtain a desired property. These monomers include styrene, α-methylstyrene, vinyltoluene, acrylonitrile, methacrylonitrile, acrolein, methacrolein, butadiene, isoprene, etc.

The acrylic type resin useful in the invention has a number average molecular weight of about 3,000 to about 100,000, preferably of about 15,000 to about 45,000, and has a glass transition temperature of $-40°$ to $+80°$ C., preferably of $-20°$ to $+50°$ C.

Typical examples of polyurethane resin type coating compositions are those cured with a polyol and those cured with moisture. Examples of useful polyisocyanate compounds are tolylene diisocyanate, diphenylmethane diisocyanate, lysine diisocyanate methyl ester, dicyclohexylmethane diisocyanate, isophorone diisocyanate, xylylene diisocyanate, hexamethylene diisocyanate, 4,4'-diphenylmethane diisocyanate, Desmodur N[OCN(CH$_2$)$_6$N{CONH—(CH$_2$)$_6$NOC}$_2$, product of Bayer AG, W. Germany, trade name] and like conventional ones, adduct of these compounds etc. Also useful are those blocked in a functional group of the isocyanate compound. Useful polyols are polyether polyol, polyester polyol, acryl polyol, epoxy polyol and like conventional polyols.

The polyurethane resin type coating composition can be prepared by mixing the above binder component with an organic solvent, coloring agent, auxiliary agent, etc., and is excellent in durability, bending property, resistance to chemicals, etc. compared with other synthetic resin coating composition.

In an epoxy resin coating composition, it is possible to use a conventional epoxy resin as a binder component. For example, polyglycidyl ether of polyphenol can be used which is obtained by reacting a polyphenol and epichlorohydrin in the presence of an alkali. Examples of useful polyphenols are bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, etc. Further, it is possible to use epoxy resin which is prepared by reacting diglycidyl ether with the above polyphenol and subsequently reacting epichlorohydrin with the resulting product.

Among the above epoxy resins, preferable are those having a number average molecular weight of at least about 350, more preferably of about 350 to 5,000, an epoxy equivalent of 150 to 4,000, more preferably of 190 to 2,000. Examples of commercially available epoxy resins are Epikote 828, 1001, 1002, 1004, 1007 (product of Shell Oil Co., Ltd.), etc.

Further, as a hardener for epoxy resin can be used polyamine, polyamide and like conventional ones.

The epoxy resin coating composition is prepared by mixing the above epoxy resin, hardener, organic solvent, coloring agent, auxiliary agent, etc. conjointly.

Further, in an alkyd resin coating composition, it is possible to use a known alkyd resin prepared by a usual method as a binder component. Examples of useful alkyd resins are oil-modified alkyd resin, rosin-modified alkyd resin, phenolic resin-modified alkyd resin, styrenated alkyd resin, acryl-modified alkyd resin, epoxy resin-modified alkyd resin, silicone resin-modified alkyd resin, oil-free alkyd resin (polyester resin), etc.

The alkyd resin coating composition can be obtained by adding to the above alkyd resin an organic solvent, coloring agent, auxiliary agent and the like.

The deicing coating composition of the invention is prepared by adding to the above synthetic resin coating composition of the organic solvent type, at least one fluorine-containing compound selected from the group consisting of urethane, phosphate, phosphonic acid derivative, phosphinic acid derivative, polyether, polyester and polyvinyl compounds, each having a perfluoroalkyl group of 6 to 20 carbon atoms.

The urethane compounds include the following compound.

A fluorine-containing urethane compound represented by the formula

wherein Rf is perfluoroalkyl group having 6 to 20 carbon atoms, X is $-C_nH_{2n}-$, $-CH_2CH(A)-$, $-CH_2CH(A)C_nH_{2n}-$ or $-SO_2N(R^1)C_mH_{2m}-$, A is hydrogen, halogen, lower alkyl, lower alkoxyl, hydroxyl, lower alkylcarbonyloxy or carboxylalkyloxy, n and m are an integer of 1 to 4, $R^1$ is hydrogen or lower alkyl, Y is divalent organic group, Z is monovalent organic group.

A fluorine-containing urethane compound having the formula

wherein Rf, X and Y are same as above.

A fluorine-containing urethane compound having the formula

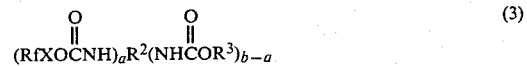

wherein Rf and X are same as above, $R^2$ is organic group having b valency, $R^3$ is alkyl having 1 to 5 carbon atoms, b is an integer of 3 to 10, a is an integer included in the range of $b \geq a \geq 1$.

The compound of the formula (1) is obtained, as described in U.S. Pat. Nos. 3398182 and 3484281, by mixing with heating the starting fluorine-containing alcohol (one mole) and diisocyanate compound (one mole) with or without presence of a catalyst such as triethylamine, etc. to perform a first-step reaction, and subsequently adding to the resulting product one mole of a specific alcohol, amine or carboxylic acid compound etc. When desired, it is possible to react one mole of diisocyanate compound with two moles of fluorine-containing alcohol to obtain a desired fluorine-containing urethane compound. Rf, X, Y and Z are determined depending on structure of the starting material.

As fluorine-containing alcohols, known compounds are widely used. For example, the following compounds are exemplified.

$$CF_3(CF_2)_dSO_2N(R^4)(CH_2)_eOH$$

wherein d is 5 to 9, e is 1 or 2, $R^4$ is —$CH_3$ or —$C_2H_5$, $$CF_3(CF_2)_u(CH_2)_vOH$$

wherein u is 7 to 12, v is 1 or 2,

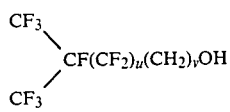

wherein u is 7 to 12, v is 1 or 2.

As diisocyanate compounds, known compounds can widely be used such as tolylene diisocyanate, diphenylmethane diisocyanate (MDI), hydrogenated MDI, hexamethylene diisocyanate, etc. The residue of the diisocyanate compound becomes divalent organic group Y.

Further, as alcohols, amines or carboxylic acid compounds, known compounds are widely used such as phenol, cyclohexanol, ethylene glycol, aliphatic alcohols having 1 to 7 carbon atoms, aniline, aliphatic amines having 1 to 3 carbon atoms, benzoic acid, aliphatic carboxylic acids having 1 to 3 carbon atoms, etc. The residue of these compounds becomes monovalent organic group Z.

The compound of the formula (2) can be prepared, for example, by reacting a diisocyanate compound of the formula OCNYNCO with a fluorine-containing alcohol of the formula RfXOH to obtain a compound of the formula

and subsequently reacting the resulting compound with water. As the diisocyanate compound and fluorine-containing alcohol, the same compounds as above can be used.

The compound of the formula (3) is prepared, for example, by reacting one mole of a polyisocyanate compound of the formula $R^2(NCO)_b$ with a mole(s) of a fluorine-containing alcohol of the formula RfXOH to obtain a compound of the formula

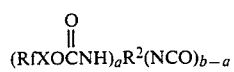

and reacting one mole of the resulting compound with (b-a) mole(s) of a lower alcohol of the formula $R^3OH$.

As polyisocyanate compound, for example, the following compounds are usable.

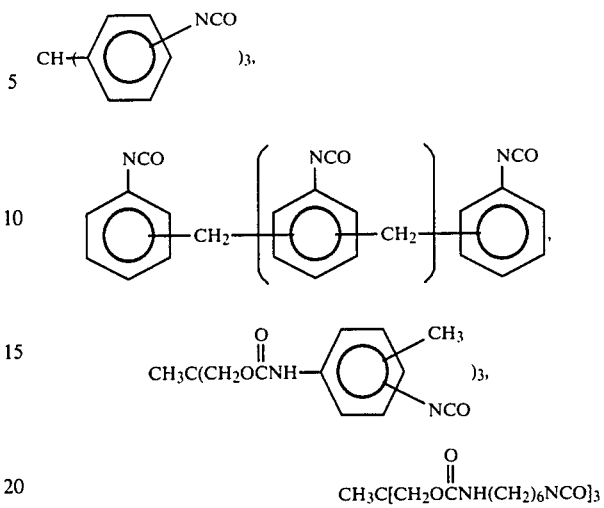

As fluorine-containing alcohol, the same compounds as above are used. As lower alcohol are used methanol, ethanol, propanol, butanol and the like.

The following compounds and salts thereof represented by the formula (4) to (7) are used as phosphate, phosphonic acid derivative and phosphinic acid derivative.

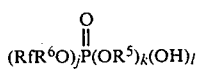 (4)

 (5)

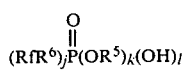 (6)

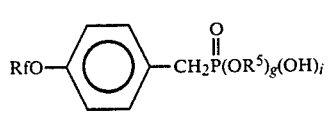 (7)

wherein Rf is same as above, $R^5$ is hydrogen, alkali metal, ammonium group or alkyl of 1 to 5 carbon atoms, $R^6$ is alkylene of 1 to 10 carbon atoms or —$CH_2$—$CH(OR^7)CH_2$—, $R^7$ is hydrogen or alkyl of 1 to 10 carbon atoms, $R^8$ is alkylene of 1 to 10 carbon atoms, j, k and l are integers, $j \geq 1$, $k \geq 0$, $l \geq 0$, $j+k+l=3$, g and i are integers, $g \geq 0$, $i \geq 0$ and $g+i=2$.

Examples of useful phosphates, phosphonic acid derivatives and phosphinic acid derivatives of the formulae (4) to (7) are set forth below.

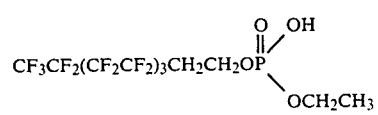

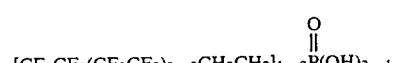

-continued

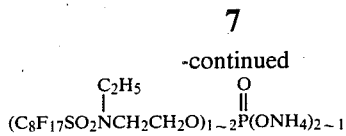

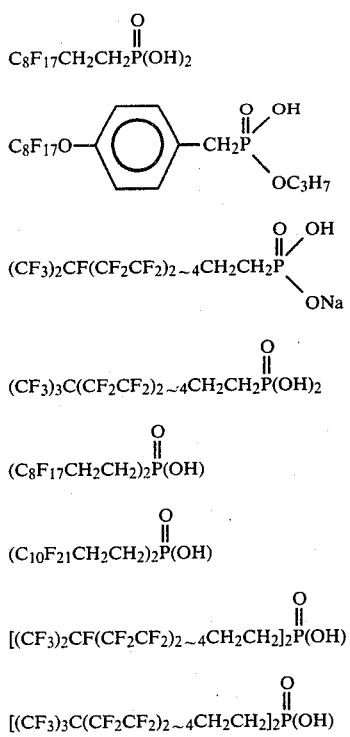

As polyether compounds are shown the following compounds.

A homopolymer of 3-perfluoroalkyl-1,2-epoxypropane of the formula

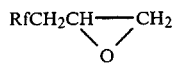   (8)

wherein Rf is same as above, a copolymer of at least two of the compound (8), or a copolymer of the compound (8) and at least one of other copolymerizable epoxide;

A copolymer (9) comprising structural units (a) and (b), the unit (a) being

—OCH[(CH$_2$)pRf]CH$_2$— or

—OCH$_2$CH[(CH$_2$)pRf]— wherein Rf is same as above, p is an integer of 1 to 10, the unit (b) being

—(OCH$_2$)r(CH$_2$)s— wherein r is an integer of 1 to 4, s is an integer of 2 to 10 when r is 1, an integer of 1 to 8 when r is 2, an integer of 0 to (12−2r) when r is 3 or 4,

—OCH$_2$CR$^9$R$^{10}$CH$_2$— whenin R$^9$ and R$^{10}$ are each CH$_3$, CH$_2$Cl, CH$_2$F, CH$_2$OCH$_3$, CH$_2$OC$_2$H$_5$, CH$_2$OCOCH$_3$, CH$_2$OC$_6$H$_5$, CH$_2$OH, CH$_2$CN or H, provided that at least one of them being other than hydrogen or —OCH$_2$(OCH$_2$CH$_2$)q— wherein q is 2 or 3.

The epoxides which are copolymerizable with the above 3-perfluoroalkyl-1,2-epoxypropane monomer include ethylene oxide, propylene oxide, epichlorohydrin, epifluorohydrin, perfluoropropylene oxide, isobutyolene oxide, butadiene oxide, styrene oxide, methyl glycidyl ether, allyl glycidyl ether, etc. The polymer or copolymer of the compound having the formula (8) is disclosed, for example, in Japanese Unexamined patent publication No. 1971-25361 or British Pat. No. 782615.

In the above copolymer (9), a part of the structural unit (b) may be substituted, when required, by other oxyethylene group of the formula

—(OCR$^{11}$CR$^{12}$—CR$^{13}$CR$^{14}$)— wherein R$^{11}$ to R$^{14}$ are each hydrogen or substituted or unsubstituted alkyl or aryl. Other oxyethylene group is used in an amount of 0 to 80 mole% based on the total amount of copolymer.

Further, copolymer (9) can be prepared by reacting an epoxide of the formula

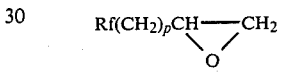

with the following cyclic ether or cyclic formal under a polymerization condition,

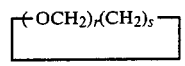

wherein r as s are same as above,

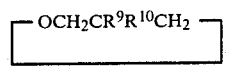

wherein R$^9$ and R$^{10}$ are same as above, or

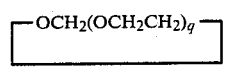

wherein q is same as above.

In the above, it is possible to conduct the reaction by replacing a part of the cyclic ether or cyclic formal by an epoxide of the formula

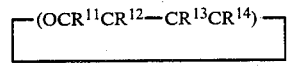

wherein R$^{11}$ to R$^{14}$ are same as above.

In the invention, as the polyester compound is shown, for example, a fluorine-containing polyester type copolymer (10) which comprises the following structural units (a), (b) and (c) in a mole ratio of

[(a)+(c)]:(b)=1:1~2:1

(a):(c)=5:95~100:0, and is at least 30° C. in softening point and solid at room temperature,

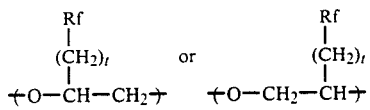 (a)

wherein Rf is same as above, t is 0 or 1,

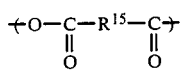 (b)

wherein $R^{15}$ represents a residue obtained by removing

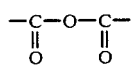

from a cyclic acid anhydride, and

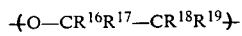 (c)

wherein $R^{16}$ to $R^{19}$ are each hydrogen or substituted or unsubstituted alkyl or aryl.

The copolymer (10) can be prepared, for example, by reacting under a polymerization condition, an epoxide of the formula

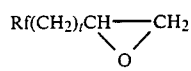 (11)

wherein Rf and t are same as above, and an cyclic acid anhydride of the formula

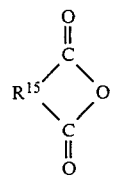 (12)

wherein $R^{15}$ is same as above.

In the above, it is possible to conduct the reaction by replacing a part of the epoxide (11) by an epoxide other than (11), namely by an epoxide of the formula

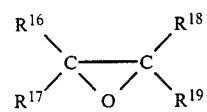 (13)

wherein $R^{16}$ to $R^{19}$ are same as above.

As the polyvinyl compound is shown, for example, ω-perfluoroalkylvinyl polymer (14) which comprises the following structural unit (a) and, when desired, unit (b) in addition thereto,

 (a)

wherein Rf is same as above, and

—CHDCHE— (b)

wherein D is $OR^{20}$, $OCOR^{20}$ and $COOR^{20}$, E is hydrogen or $COOR^{21}$, $R^{20}$ and $R^{21}$ are same or different and are each alkyl having 1 to 18 carbon atoms, provided that E is hydrogen when D is $OR^{20}$ or $OCOR^{20}$.

The copolymer (14) is prepared, for example, by reacting under a polymerization condition a vinyl compound of the formula

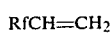

wherein Rf is same as above, other monomer and, when required, alkyl vinyl ether, organic acid vinyl ester or maleic ester represented by the formula

wherein D and E are same as above.

Examples of useful other monomers, another starting material, are alkyl acrylate, alkyl methacrylate, acrylonitrile, methacrylonitrile, aliphatic acid vinyl ester, styrene, alkyl substituted styrene, vinyl halide, vinylidene halide, aliphatic acid allyl ester, vinyl alkyl ketone, vinyl alkyl ether, conjugated 1,3-diene, etc.

Among other starting materials, preferable are alkyl vinyl ether, organic acid vinyl ester and maleic ester.

Examples of alkyl vinyl ether of the formula $R^{20}OCH=CH_2$ are methyl vinyl ether, ethyl vinyl ether, butyl vinyl ether, isobutyl vinyl ether, octadecyl vinyl ether, stearyl vinyl ether, chloromethyl vinyl ether, 2-chloroethyl vinyl ether, chloropropyl vinyl ether, etc.

Compounds of the formula $R^{20}COOCH=CH_2$ include vinyl acetate, vinyl caprylate, vinyl stearate, vinyl butyrate, vinyl caproate, vinyl chloroacetate, etc.

Compounds of the formula $R^{20}OCOCH=CH-COOR^{21}$ include dimethyl maleate, diethyl maleate, di-n-butyl maleate, di-2-ethylhexyl maleate, dinonyl maleate, etc.

Compounds of the formula $R^{20}OCOCH=CH_2$ include stearyl acrylate, octadecyl acrylate, etc.

The deicing coating composition of the invention can be prepared by adding to 100 parts by weight of the resin solids of the above synthetic resin coating composition of the organic solvent type, 0.1 to 75 parts by weight, preferably 0.1 to 30 parts by weight of at least one fluorine-containing compound, and homogeneously dissolving or dispersing the compound therein, the fluorine-containing compound being selected from among urethane, phosphate, phosphonic acid derivative, phosphinic acid derivative, polyether, polyester and polyvinyl compound, each having perfluoroalkyl group having 6 to 20 carbon atoms. With less than 0.1 part by weight of the compound, the coating composition has no deicing ability, whereas with more than 75 parts by weight, the deicing ability is not sufficient due to loss of phase-separated structure.

In the invention, the alkali metal compound of the formula $Ma^{\oplus}X^{\ominus}$ is, when required, added to the coating composition. M is an alkali metal which is selected from among Li, Na and K, Li being most preferable. X is inorganic acid radical, hydroxyl or organic acid radical. Inorganic acid radical means a residue removed from an inorganic acid molecule at least one hydrogen atoms which can be replaced by metal, and includes $F^{\ominus}$, $Cl^{\ominus}$, $Br^{\ominus}$, $I^{\ominus}$ and like single atoms, $NO_3^{\ominus}$, $CO_3^{2\ominus}$, $PO_4^{3\ominus}$, $HPO_4^{2\ominus}$, $SO_4^{2\ominus}$, $HSO_4^{\ominus}$, $Cr_2O_7^{2\ominus}$, $SiO_4^{4\ominus}$, $SiO_3^{2\ominus}$, $BO_2^{\ominus}$, $VO_4^{3\ominus}$, $WO_4^{2\ominus}$ and like groups, etc.

Organic acid radical is a residue obtained by removing at least one hydrogen atoms which can be replaced by metal from a saturated or unsaturated mono- or polycarboxylic acid molecule. Examples of the radicals are $HCOO^{\ominus}$, saturated monocarboxylic acid radical of the formula $CH_3(CH_2)xCOO^{\ominus}$ (x: integer of 0 to 20), saturated dicarboxylic acid radical of the formula

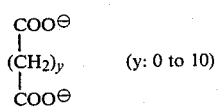

(y: 0 to 10)

unsaturated acid radical such as maleic acid radical, oleic acid radical, linoleic acid radical, etc., polycarboxylic acid radical such as tartaric acid radical, citric acid radical, trimellitic acid radical, pyromellitic acid radical, etc., and a is usually an integer of 1 to 4, determined depending on the kind of inorganic or organic acid radical.

Typical examples of the alkali metal compounds represented by the above formula are LiF, LiCl, LiBr, LiI, NaF, NaCl, NaBr, NaI, KF, KCl, KBr, KI, $LiNO_3$, $NaNO_3$, $KNO_3$, $Li_2CO_3$, $Na_2CO_3$, $K_2CO_3$, $Li_3PO_4$, $Na_3PO_4$, $K_3PO_4$, $Li_2SO_4$, $Na_2SO_4$, $K_2SO_4$; $LiMnO_4$, $NaMnO_4$, $KMnO_4$, $Li_2Cr_2O_7$, $Na_2Cr_2O_7$, $K_2Cr_2O_7$, $Li_4SiO_4$, $Li_2SiO_3$, $Na_4SiO_4$, $Na_2SiO_3$, $K_4SiO_4$, $K_2SiO_3$, $LiBO_2$, $NaBO_2$, $KBO_2$, $Li_3VO_4$, $Na_3VO_4$, $K_3VO_4$, $Li_2WO_4$, $Na_2WO_4$, $K_2WO_4$; HCOOLi, HCOONa, HCOOK, $Li_2C_2O_4$, $Na_2C_2O_4$, $K_2C_2O_4$, $CH_3COOLi$, $CH_3COONa$, $CH_3COOK$, $C_2H_5COOLi$, $LiOOC-CH_2-COOLi$, lithium citrate, sodium citrate, potassium citrate, lithium tartrate, lithium trimellitate, lithium pyromellitate, etc. These alkali metal compounds are used singly or in mixture of at least two of them.

Among these alkali metal compounds, chlorides thereof are most excellent in deicing ability. However, when using such a strong acid salt, care should be paid on use in order not to produce rust on a metallic material. Carbonates, silicates and acetates of alkali metal compounds have the second best property in preventing ice deposition. These are preferable because they exhibit continuous deicing property and hardly produce rust. Among these alkali metal compounds, lithium salts are most preferable compared with sodium salts or potassium salts, since lithium salts have an excellent deicing property.

The alkali metal compound is added in an amount of 0.1 to 50 parts by weight, preferably 1 to 20 parts by weight per 100 parts by weight of the resin solids of the synthetic resin coating composition of the organic solvent type. With less than 0.1 part by weight of alkali metal compound, the coating composition has a low deicing ability, whereas with more than 50 parts by weight, the coating is low in its property and can not withstand for a long period of use.

Since the coating composition of the invention is usually employed in a low temperature atmosphere below 0° C. from a purpose thereof, the composition possibly has a defect that the resulting coating may crack or break. In order to improve the coating property at a low temperature, it is possible, when required, to add a cellulose derivative.

The cellulose derivatives include both of ester-modified and ether-modified type cellulose derivative having an average molecular weight of usually about 3,000 to about 200,000, preferably about 5,000 to about 50,000. Examples of the former ester-modified type cellulose derivatives are nitrocellulose, celulose acetate butyrate, cellulose acetate propionate, cellulose acetate phthalate, acetylcellulose, etc. These cellulose ester has preferably an average esterification degree of 15 to 70%.

The latter ether-modified type cellulose derivatives include methylcellulose, ethylcellulose, butylcellulose, carboxymethylcellulose, hydroxyethylcellulose, hydroxypropylcellulose, etc. These cellulose ether has particularly an average etherification degree of 30 to 70%.

Among these cellulose derivatives, cellulose acetate butyrate is preferable from a view point of cost and excellent property in tenacity. The cellulose derivative is used in an amount of up to 20 parts by weight, preferably up to 10 parts by weight per 100 parts by weight of the resin solids of the synthetic resin coating composition of the organic solvent type.

In the preparation of deicing coating composition of the invention, to the synthetic resin coating composition of the organic solvent type is previously added an organic solvent which dissolves effectively a fluorine-containing compound such as an urethane compound having a perfluoroalkyl group, etc. Subsequently, to the mixture is added the fluorine-containing compound and, when required, alkali metal compound and the resulting mixture is admixed with a mixer or the like.

The present composition can be applied to an under coat as a top coat, or can be coated directly on a metal, plastics, glass, wood material, etc. Further, the present composition can be used as laminated on the article in the form of a molded product.

The present invention will be described in more detail with reference to examples. Parts and % are shown as parts by weight and wt% unless otherwise specified.

FIG. 1 is a sectional view showing a device for testing the coating composition of the invention for deicing ability. In the drawing, 1 is a flat stainless steel plate, 2 coating, 3 stainless steel ring, 4 ice and 5 tensile testing machine.

EXAMPLES 1 TO 6

The deicing coating compositions were prepared by adding each solution of ① to ⑥ containing the fluorine-containing compound listed below to an acrylic resin coating composition of the organic solvent type ("Acrylic No. 1000", a product of Kansai Paint Co., Ltd., 45% solid concn., room-temperature curing type), and thoroughly stirring the mixture by use of a mixer.

The obtained coating composition was coated by an applicator on a stainless steel plate for deicing test and dried at room temperature. The coating had a thickness of 10 μm after drying. The coating was freezed at −10° C. for 2 hours according to later-mentioned test method and then ice breaking strength was measured by use of a tensile testing machine (tensile speed: 250 mm/min).

For comparison, the acrylic resin coating composition per se (Comparison Example 1) containing no fluorine-containing compound solution was tested in the same condition as above. The results were given in Table 1.

| | | | |
|---|---|---|---|
| ① | (a) | $(C_8F_{17}CH_2CH_2O)_2\overset{O}{\underset{\|}{P}}OH$ | 20% |
| | (b) | Isopropyl alcohol | 40% |
| | (c) | m-Xylene hexafluoride | 40% |
| ② | (a) | Fluorine-containing polyester compound obtained from $CF_3CF_2(CF_2CF_2)_nCH_2CH\underset{\diagdown O \diagup}{-}CH_2$ | 40 mole % |
| | | Glycidyl phenyl ether | 30 mole % |
| | | Phthalic anhydride | 30 mole % |
| | | | 20% |
| | (b) | Acetone | 20% |
| | (c) | Methyl isobutyl ketone | 60% |
| ③ | (a) | Fluorine-containing polyvinyl compound obtained from $C_8F_{17}CH=CH_2$ | 50% |
| | | $CH_3(CH_2)_{16}\overset{O}{\underset{\|}{C}}OCH=CH_2$ | 50% |
| | | | 20% |
| | (b) | Methyl ethyl ketone | 40% |
| | (c) | m-Xylene hexafluoride | 40% |
| ④ | (a) | $C_8F_{17}CH_2CH_2O\overset{O}{\underset{\|}{C}}NH-\bigcirc\!\!-CH_3$, $NH\overset{O}{\underset{\|}{C}}O(CH_2CH_2O)_9CH_3$ | 20% |
| | (b) | Trifluorotrichloroethane | 40% |
| | (c) | Acetone | 40% |
| ⑤ | (a) | Fluorine-containing polyether compound obtained from $CF_3CF_2(CF_2CF_2)_nCH_2CH\underset{\diagdown O \diagup}{-}CH_2$ | 40 mole % |
| | | $\begin{bmatrix} n=3 & 60.4\text{ mole \%} & n=4 & 24.8\text{ mole \%} \\ n=5 & 9.6\text{ mole \%} & n=6 & 3.7\text{ mole \%} \\ n=7 & 1.5\text{ mole \%} & & \end{bmatrix}$ | |
| | | $ClCH_2CH\underset{\diagdown O \diagup}{-}CH_2$ | 60 mole % |
| | | | 20% |
| | (b) | Acetone | 60% |
| | (c) | m-Xylene hexafluoride | 20% |
| 6 | | $(C_8F_{17}CH_2CH_2O\overset{O}{\underset{\|}{C}}NH-\bigcirc\!\!-)_2-CH-\bigcirc\!\!-NH\overset{O}{\underset{\|}{C}}OCH_3$ | 20% |
| | | Toluene | 80% |

TABLE 1

| | Acrylic No. 1000 | Solution of fluroine-containing compound | Ice breaking strength (kg/cm²) |
|---|---|---|---|
| Ex. 1 | 100 parts | ① 100 parts | 1.4 |
| Ex. 2 | 100 parts | ② 100 parts | 1.0 |
| Ex. 3 | 100 parts | ③ 100 parts | 1.6 |
| Ex. 4 | 100 parts | ④ 100 parts | 0.7 |
| Ex. 5 | 100 parts | ⑤ 100 parts | 1.4 |
| Ex. 6 | 100 parts | ⑥ 100 parts | 0.9 |
| Com. Ex. 1 | 100 parts | — | 3.5 |

EXAMPLES 7 TO 12

The deicing coating compositions were prepared by adding each solution of the fluorine-containing compound, and alkali metal compound listed in Table 2 to an urethane resin coating composition of the organic solvent type ("Retan PG-80 Clear", a product of Kansai Paint Co., Ltd., 40% solid concn.), and thoroughly stirring the mixture by use of a mixer.

The obtained coating composition was coated by an applicator on a stainless steel plate for deicing test and dried at room temperature. The coating had a thickness of 80 μm after drying. Ice breaking strength was measured in the same manner as in Example 1.

For comparison, the urethane resin coating composition per se (Comparison Example 2) without addition of both of the fluorine-containing compound solution and alkali metal compound, and a coating composition containing no fluorine-containing compound solution (Comparison Example 3) were tested in the same conditions as above. The results were shown in Table 2.

TABLE 2

| | Retan PG-80 Clear | Soln of fluorine-containing compound | | Alkali metal compound | | Ice breaking strength (kg/cm$^2$) |
|---|---|---|---|---|---|---|
| Ex. 7 | 100 parts | ② | 50 parts | Li$_2$CO$_3$ | 20 parts | 0.85 |
| Ex. 8 | 100 parts | ① | 100 parts | — | | 2.0 |
| Ex. 9 | 100 parts | ⑤ | 100 parts | Na$_2$CO$_3$ | 5 parts | 0.98 |
| Ex. 10 | 100 parts | ④ | 30 parts | Na$_2$CO$_3$ | 15 parts | 1.2 |
| Ex. 11 | 100 parts | ⑥ | 100 parts | lithium silicate | 10 parts | 0.45 |
| Ex. 12 | 100 parts | ⑥ | 10 parts | lithium silicate | 10 parts | 1.6 |
| Com. Ex. 2 | 100 parts | — | | — | | 4.9 |
| Com. Ex. 3 | 100 parts | — | | lithium silicate | 10 parts | 2.7 |

Method of ice breaking strength test:

The composition of the invention is applied to a flat stainless steel plate 1 (100×70×10 mm) to form a coating 2, and a stainless steel ring 3 (5 cm$^2$ in interior area) is placed on the coating 2 as shown in FIG. 1. The assembly is placed into a freeze testing constant-temperature chamber at −10° C. and pre-cooled for 90 minutes. Subsequently, 2 ml of distilled deionized water maintained at 5° C. is poured into the ring 3 and frozen to obtain an ice 4 adhered to the specimen to be tested. The assembly is thereafter allowed to stand at −10° C. for 2 hours and then connected to a tensile testing machine (not shown). The breaking strength (kg/cm$^2$) for separating the ice 4 from the coating 2 is measured by subjecting the ring 3 to impact at a tensile speed of 250 mm/min.

We claim:

1. A deicing coating composition characterized in that the composition comprises a synthetic resin coating composition of the organic solvent type and 0.1 to 75 parts by weight, per 100 parts by weight of the resin solids of the component composition, of at least one fluorine-containing compound selected from the group consisting of urethane, phosphate, phosphonic acid derivative, phosphinic acid derivative, polyether, polyester and polyvinyl compounds having a perfluoroalkyl group with 6 to 20 carbon atoms.

2. A composition as defined in claim 1 wherein an alkali metal compound is further added in an amount of 0.1 to 50 parts by weight per 100 parts by weight of the resin solids of the component composition, the alkali metal compound being represented by the formula $$M_a^\oplus X^\ominus$$

wherein M is an alkali metal selected from among Li, Na and K, X is an inorganic acid radical, hydroxyl group or organic acid radical, and a is an integer of from 1 to 4.

3. A composition as defined in claim 2 wherein M is Li.

4. A composition as defined in claim 1 wherein a cellulose derivative is further added in an amount of up to 20 parts by weight per 100 parts by weight of the resin solids of the component composition.

5. A method of preventing ice deposition from firmly adhering to the surface of an article which comprises applying the composition of claim 1 or 2 to the surface of the article.

6. An article coated with the deicing coating composition according to claim 1 or 2.

* * * * *